April 12, 1927.
A. J. CHRISTOPHER
1,624,536
INDUCTANCE DEVICE
Filed Dec. 13, 1924
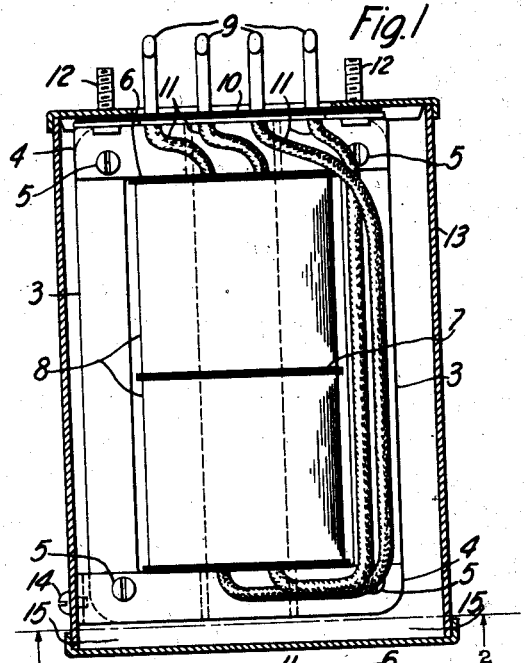
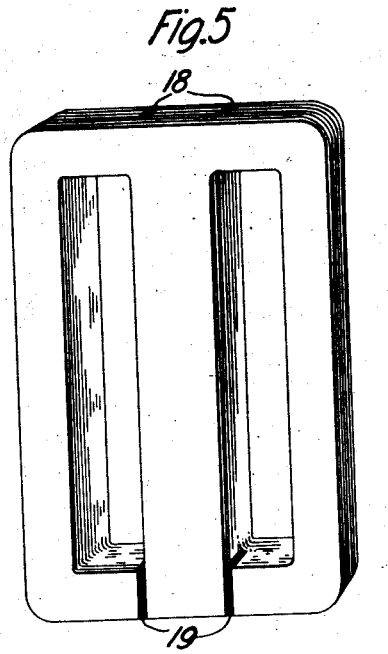
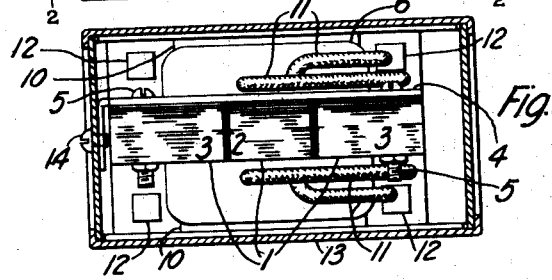
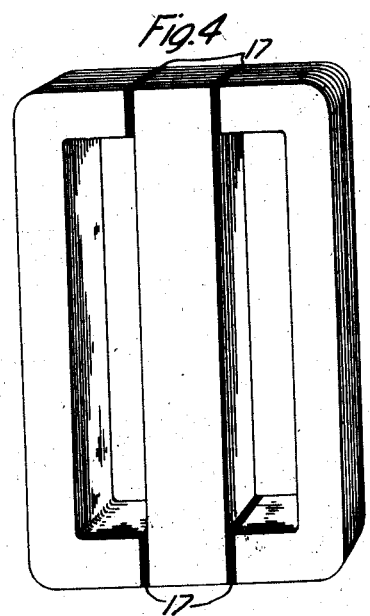
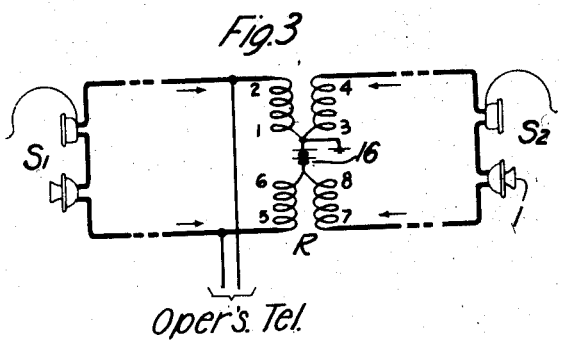
Inventor:
Arthur J. Christopher
by ℰ.W. Adams Atty.

Patented Apr. 12, 1927.

1,624,536

UNITED STATES PATENT OFFICE.

ARTHUR J. CHRISTOPHER, OF NEW YORK, N. Y., ASSIGNOR TO WESTERN ELECTRIC COMPANY, INCORPORATED, OF NEW YORK, N. Y., A CORPORATION OF NEW YORK.

INDUCTANCE DEVICE.

Application filed December 13, 1924. Serial No. 755,640.

This invention relates to inductance devices, and particularly to transformers or repeating coils of the shell-type, such as are used in telephone circuits.

An object of the invention is to provide a method of and means for improving the transmission efficiency of telephone transformers or repeating coils of the shell-type when carrying varying values of superposed direct current.

In transformers or repeating coils of the type used in telephone circuits for carrying superposed direct current, such as battery supply repeating coils, it is necessary for efficient transmission of telephone currents that the magnetic field circuits be provided with an air-gap or air-gaps to prevent an appreciable decrease in the inductance of the windings with increasing values of the superposed direct current. Air-gaps are readily provided in laminated cores made up of lamination sections of different shapes by stacking the sections so that the joints between successive layers coincide.

In such transformers or repeating coils, it has been found necessary also to obtain a high degree of impedance balance between the windings, in order to prevent objectionable noise and cross-talk trouble due to unbalance in the circuit.

In accordance with the invention, a high degree of impedance balance between the windings of an inductance device carrying superposed direct current may be obtained in a structure comprising a shell-type magnetic core having air-gaps symmetrically distributed therein and a plurality of equal windings, mounted on the central limb of the core. The symmetrical distribution of the air-gaps in a laminated core may be readily obtained by using for each layer of the laminated core either C- and straight or I-shaped laminations, or substantially closed 8-type laminations, and stacking these laminations in a particular way.

For a better understanding of the invention reference is made in the accompanying drawings wherein:

Fig. 1 shows a side view partly in section of the repeating coil embodying the invention; Fig. 2 shows an end view partly in section, of the repeating coil of Fig. 1, taken along the line 2—2 of Fig. 1; Fig. 3 illustrates in diagrammatic form the arrangement of the windings of the repeating coil of the invention, when used in a simple telephone circuit; Fig. 4 shows an arrangement employing C- and I-shaped laminations which is used in the core of the repeating coil shown in Figs. 1 and 2; Fig. 5 shows another arrangement employing substantially closed 8-type laminations which may be used in the core of the repeating coil shown in Figs. 1 and 2.

Referring in detail to the drawing, the magnetic core 1 in the particular embodiment of Figs. 1 and 2 is composed of a plurality of C-shaped pieces and a plurality of straight or I-shaped pieces of magnetic material, such as silicon steel or permalloy, placed together in such a way as to form a two-mesh magnetic core of the shell-type, having a central limb 2 and outer limbs 3. Laminations forming the parts 2 and 3 are held together by the clamping plates 4, which are attached thereon by means of screws or rivets 5. The arrangement of the C- and I-shaped lamination sections in core 1 is shown more in detail in Fig. 4.

Mounted on the central limb 2 of the core 1 is a spool 6 of suitable insulating material, such as phenol fibre, having a separator 7 also of insulating material around its central portion, dividing the spool 6 into two equal halves, on which are wound inner and outer windings 8. The windings 8 comprise two equal primary and two equal secondary windings one of each being wound around each half of the spool 6.

The metal terminals 9 arranged on a terminal plate 10 of insulating material are soldered to and serve as mechanical protection to the lead wires 11 from the windings 8, comprising the two primary and the two secondary windings. Only the four leads 11 from the inner windings and the four terminals 9 to which they are attached are shown in Fig. 1. The four leads from the outer windings, which are not shown in this view, are attached to four terminals arranged similarly to those shown on the opposite side of the repeating coil.

The terminal plate 10 is attached to one of the front clamping plates 4, also functioning as a mounting bracket, by means of mounting studs 12. The core 1 and the windings 8 mounted thereon are contained in a suitable metal case or container 13. An extension on one of the clamping plates 4 is attached to case 13 by means of a screw 14. The air space 15 between the case 13 and the rear end of core 1 is provided for the purpose of reducing the magnetic flux from the core 1 through case 13, which would tend to unbalance the magnetic circuit of the repeating coil.

As the studs 12 are fastened directly to the mounting bracket 4 of core 1, no mechanical strain due to the weight of the repeating coil parts is placed on the case 13. In use, the core 1 may be grounded through the mounting studs 12 and the panel on which the case 13 is to be mounted.

The arrangement of the windings of the repeating coil of the invention is shown diagrammatically in Fig. 3, which illustrates the coil used as a battery supply repeating coil in a simple telephone circuit. Referring to Fig. 3, the repeating coil R comprises windings 2—1 and 6—5, which for convenience in description will be referred to as the primary windings, and windings 4—3 and 8—7, which will be referred to as the secondary windings. In the particular repeating coil illustrated, windings 2—1 and 6—5 are the inner windings, winding 2—1 being wound on one half of spool 6 and winding 6—5 on the other half of spool 6. Windings 4—3 and 8—7 are the outer windings, winding 4—3 being wound over winding 2—1 on one half of spool 6 and winding 8—7 over winding 6—5 on the other half of spool 6.

Terminal 1 of one of the primary windings and terminal 3 of one of the secondary windings are connected to the positive pole of battery 16, and terminal 6 of the other primary winding and terminal 8 of the other secondary winding are connected to the negative pole of battery 16. A subscriber's telephone set $S_1$ is adapted to be connected to terminal 2 of one primary winding and terminal 5 of the other primary winding. In like manner, another subscriber's telephone set $S_2$ is adapted to be connected to terminal 4 of one secondary winding and terminal 7 of the other secondary winding. An operator's telephone set may be connected across the primary side of the repeating coil R for monitoring purposes.

Now, any electrical disturbance which may occur in the line between either subscriber's set $S_1$ or $S_2$ and the repeating coil R will set up disturbing currents in the line in either direction, as indicated by the arrows, unless the impedance of winding 2—1 is equal to the impedance of winding 6—5, and the impedance of winding 4—3 is equal to the impedance of winding 8—7. These disturbing currents may cause objectionable noise in either one or both of the subscribers' sets $S_1$ and $S_2$. To reduce this noise to an unobjectionable amount, it is not necessary that the impedance ratio between the primary and secondary windings be unity, i. e., that the combined impedance of windings 2—1 and 6—5 be equal to the combined impedance of windings 4—3 and 8—7, but only that the impedance of winding 2—1 be substantially equal to that of winding 6—5 and the impedance of winding 4—3 be substantially equal to that of winding 8—7. Arrangements in accordance with the invention which will serve to balance the impedances of these windings to a degree which will reduce the noises referred to above to an unobjectionable amount are shown in Figs. 4 and 5.

In Fig. 4 is shown an arrangement of C-shaped and straight or I-shaped laminations of magnetic material, which may be used in the core 1 of Fig. 1. Referring to Fig. 4, it will be noted that each layer of the core consists of two C-shaped and one I-shaped lamination, with the I lamination situated between the two C laminations, and that these layers are arranged so as to provide two complete air gaps 17 at each end of the core which are symmetrically distributed with respect to the center lines of the core. When used in the core of the repeating coil shown in Figs. 1 and 2, this symmetrical arrangement of the air gaps will provide equal reluctances in the magnetic circuits at each end of the core, thus balancing the inductance of two equal windings when placed at either end of the core.

It has been found that if the laminations are assembled so that the air gaps 17 are of equal length, this arrangement will provide an impedance balance between two end windings on the central limb of the core, either 2—1 and 6—5 or 4—3 and 8—7, as shown in Fig. 3, which will be substantially equivalent to the balance obtainable using a core structure without air-gaps. It has been found by experiment that in this type of coil, the impedance balance between the windings may be easily adjusted within 1%.

In Fig. 5 is shown a modified core comprising substantially closed 8-type laminations, instead of the C-shaped and 4-shaped laminations as in the preceding Fig. 1 which may be employed in the core of the repeating coil shown in Fig. 1 to obtain the required impedance balance between the windings. Referring to Fig. 5, it will be noted that one half of the 8-shaped laminations are stacked so as to form two air gaps 18 on one end and on one side of the core structure, and the remaining half are stacked so as to form two air gaps 19 at the opposite end and side of the core structure, these air gaps being symmetrical with respect to the center lines of the core.

As in the arrangement of Fig. 4, it has been found that, if the laminations are assembled so that air gaps 18 and 19 are of equal length, the arrangement of Fig. 5 will provide an impedance balance between two end windings on the central limb of the core, either 2—1 and 6—5, or 4—3 and 8—7 as shown in Fig. 3, which will be substantially equivalent to the balance obtainable using a core structure without air-gaps. It has been found experimentally in this case also that the impedance balance between windings may be adjusted within 1%.

A core employing the arrangement of C and I laminations illustrated in Fig. 4 is adapted especially to circuits carrying relatively large values of superposed direct current, as complete air gaps are obtained in such a core, the length of which may be readily adjusted. Also, such a core may be cheaply constructed and assembled. The core employing the arrangement of substantially closed 8-type laminations illustrated in Fig. 5, however, is adapted especially for conditions where a maximum inductance is required in the repeating coil or transformer when relatively small values of superposed direct current are used, as only partially complete air-gaps are obtained.

Although the invention has been illustrated and described in connection with its use in telephone repeating coils, it is to be understood that it also may be applied to any other types of inductance devices having shell-type cores, where a high degree of impedance balance is desired between the windings when used to carry varying values of superposed direct current.

It will be obvious that the general principles herein disclosed may be embodied in other inductance devices widely different from those illustrated and without departing from the spirit of the invention as defined in the following claims.

What is claimed is:

1. In an inductance device, a magnetic core comprising a central branch and outer branches, a plurality of windings of equal impedances around said central branch, and means to maintain the impedance balance between said windings for varying values of superposed direct current comprising air-gaps in said core symmetrically arranged with respect to said windings.

2. In an inductance device, a plurality of primary windings of equal impedances placed side by side and a plurality of secondary windings of equal impedances placed side by side, and a magnetic core therefor comprising a central branch and two outer branches in shunt therewith forming two magnetic circuits of equal reluctances, said primary and secondary windings being wound on said central branch of said core, said core having a plurality of air-gaps formed through the magnetic circuit thereof symmetrically arranged with respect to the center-lines of said circuit, said magnetic circuit effecting an impedance balance between said primary windings, and between said secondary windings for varying values of superposed direct current flowing therein.

3. In an inductance device, the combination with at least two primary windings placed side by side and having equal electrical characteristics and at least two secondary windings placed side by side and having equal electrical characteristics, of a core comprising a straight leg and a plurality of similar C-shaped legs, said C-shaped legs being arranged to face in towards said straight leg, but spaced therefrom to form two equal air-gaps in each magnetic circuit, including said straight leg and one of said C-shaped legs, said straight leg threading said primary and secondary windings, thereby effecting an impedance balance between said two primary windings and between said two secondary windings for varying values of superposed direct current flowing in said windings.

4. In an inductance device, the combination with a plurality of windings inductively balanced, of a core comprising a plurality of layers of magnetic material, each of said layers comprising an I-shaped piece and two C-shaped pieces, said C-shaped pieces in each layer facing in toward the I-shaped pieces but spaced therefrom so as to form a shell-type core having a central limb and two outer limbs, said windings being mounted side by side on said central limb, and said core having two equal air-gaps on each side of said central limb.

5. An inductance device comprising a magnetic core having a central limb and two outer limbs forming two magnetic circuits in said core, and at least one pair of windings of balanced impedances mounted side by side on said central limb, said magnetic core comprising a plurality of C-shaped and I-shaped laminations, said C-shaped and I-shaped laminations being so stacked as to form two air-gaps in each of said magnetic circuits, the air-gaps in said magnetic circuits being symmetrically arranged in said core, the reluctances of said magnetic circuits being thereby balanced so as to effect substantially perfect impedance balance between said windings for varying values of superposed direct current therein.

6. In a transformer, the combination with at least two electrically equivalent primary windings and at least two electrically equivalent secondary windings, of a magnetic core comprising a central limb and two similar outer limbs comprising two magnetic circuits threading said windings, at least one of said primary windings and at least one of said secondary windings being mounted on each half of said central limb, each of said magnetic circuits being provided with air-gaps of equal size symmetrically distributed with respect to center-lines of said core whereby a high degree of impedance balance is obtained between the two primary windings mounted on opposite halves of said central limb, and between the two secondary windings mounted on opposite halves of said central limb of said core for both the main and leakage flux, for varying values of superposed direct current in said windings.

7. In a telephone repeating coil, the combination with at least two primary windings with equal electrical properties and at least two secondary windings with equal electrical properties, of a shell-type magnetic core comprising a central limb and two outer limbs forming two magnetic circuits, at least one of said primary windings and one of said secondary windings being mounted on each end of said central limb, said central limb comprising a plurality of similar I-shaped pieces stacked together, said outer limbs each comprising a plurality of similar C-shaped pieces stacked together, said C-shaped pieces in each outer limb being arranged to face in toward said I-shaped pieces in said central limb but spaced equally therefrom so as to form two air-gaps of equal size in each of said magnetic circuits whereby the impedances of two equal primary windings on opposite ends of said central limb effectively balance each other with respect to both the main and leakage flux, and the impedances of two equal secondary windings on opposite ends of said central limb effectively balance each other with respect to both the main and leakage flux for any operating condition of superposed direct current in said windings.

In witness whereof, I hereunto subscribe my name this 10th day of December A. D., 1924.

ARTHUR J. CHRISTOPHER.